United States Patent [19]
LaPadula et al.

[11] Patent Number: 5,574,784
[45] Date of Patent: Nov. 12, 1996

[54] DYNAMIC ADMISSION CONTROL FOR TELECOMMUNICATIONS RELAY SERVICE WITH TEXT-TO-SPEECH SYNTHESIS

[75] Inventors: Charles A. LaPadula, Tinton Falls; Daniel J. Yaniro, Jr., Middletown, both of N.J.

[73] Assignee: Lucent Technologies Inc., Murray Hill, N.J.

[21] Appl. No.: 979,134

[22] Filed: Nov. 20, 1992

[51] Int. Cl.$^6$ .......................... H04M 11/00; H04M 3/42
[52] U.S. Cl. .............................. 379/309; 379/52; 379/88; 379/266
[58] Field of Search .............................. 379/52, 67, 214, 379/218, 265, 266, 201, 88, 89, 309

[56] References Cited

U.S. PATENT DOCUMENTS

| | | | |
|---|---|---|---|
| 4,430,726 | 2/1984 | Kasday et al. | 364/900 |
| 4,757,529 | 7/1988 | Glapa et al. | 379/214 |
| 5,014,303 | 5/1991 | Velius | 379/266 |
| 5,134,652 | 7/1992 | Brown et al. | 379/163 |
| 5,163,081 | 11/1992 | Wycherley et al. | 379/52 |
| 5,164,983 | 11/1992 | Brown et al. | 379/265 |
| 5,278,898 | 1/1994 | Cambray et al. | 379/266 |
| 5,289,523 | 2/1994 | Vasile et al. | 379/52 |
| 5,309,505 | 5/1994 | Szlam et al. | 379/88 |
| 5,351,288 | 9/1994 | Engelke et al. | 379/52 X |

*Primary Examiner*—Krista M. Zele
*Assistant Examiner*—Scott L. Weaver
*Attorney, Agent, or Firm*—Eugene J. Rosenthal; Dennis J. Williamson

[57] ABSTRACT

In a system for providing telecommunications relay service, the delay in assigning an attendant to an established relay session after the text-to-speech conversion process may be controlled by establishing new relay sessions, in response to requests therefor, only if a) less than a predetermined maximum number K of relay sessions have already been established, b) none of the established relay sessions are queued and waiting for an attendant and c) an attendant is available. An established relay session is one that is 1) being served by an attendant, 2) is waiting to be reconnected to an attendant or 3) is in the midst of the text-to-speech conversion process. The value of K is greater than or equal to the number of attendants. It is determined dynamically, as a function of 1) a given set of performance objectives, 2) the current set of traffic characteristics, 3) the current performance characteristics and 4) the resources available at the telecommunications relay service center.

27 Claims, 9 Drawing Sheets

DYNAMIC ADMISSION CONTROL FOR TELECOMMUNICATIONS RELAY SERVICE WITH TEXT-TO-SPEECH SYNTHESIS

TECHNICAL FIELD

This invention relates to the processing of communication sessions between sound impaired persons and individuals who are not sound impaired.

BACKGROUND OF THE INVENTION

Telecommunications relay service allows a sound impaired person, i.e., a hearing or speech impaired individual, to employ a data-type terminal for engaging in a communication session over a telephone network with a sound unimpaired person who does not have a matching terminal but instead has a telephone station set for use in voice based communication. Telecommunications relay service is well known and was formerly called dual party relay (DPR) service. Such service is currently provided by having a live attendant, i.e., a communications assistant, dedicated to each relay session. The live attendant a) reads over the telephone to the unimpaired person text messages that are transmitted to the attendant by the sound impaired person using the data-type terminal and b) transcribes and transmits to the sound impaired person the text of that which he hears being spoken by the unimpaired person. The terminal employed may be a unit such as: a) a personal computer, b) a data terminal or c) a text telephone, which was formerly known as a telecommunications device for the deaf (TDD).

It has been recognized in the art that one of the functions performed by the live attendant can presently be automated; namely, that text-to-speech systems can be employed to speak to the unimpaired person the text messages that are input by the sound impaired person. Therefore, the functions performed by such a live attendant are reduced and, correspondingly, the time required to perform the attendant's job is reduced. In fact, such systems can detect a code word used to indicate the end of a text message and only summon the live attendant upon such detection.

As a result, telecommunications relay service systems will shortly be deployed in which a live attendant may be shared over several such relay sessions. If there is more than one live attendant they may be grouped in a pool from which each may be assigned, on an as needed basis, to perform transcription for any relay session that is in progress and for which an automated text-to-speech conversion has just completed. Such attendants may be assigned in a fashion similar to that employed to assign transcribers disclosed in U.S. Pat. No. 4,430,726 issued on Feb. 7, 1984 to L. R. Kasday, which is incorporated herein by reference.

It is recognized that a delay may result between the completion of the automated text-to-speech conversion and the assignment of a live shared attendant for transcribing and transmitting that which the unimpaired person says. Such a delay is known as the reconnect delay. While waiting for the assignment of the live shared attendant the relay session is held in a queue of relay sessions similarly waiting.

The existence of the reconnect delay requires the unimpaired person to wait before he speaks after completion of the text-to-speech conversion, until he is certain that one of the shared attendants is assigned to his relay session. If the unimpaired person does not wait until one of the shared attendants is assigned to his relay session, part of what he says will not be heard by the attendant ultimately assigned and might, consequently, be lost. Because the unimpaired person typically wishes to begin speaking as soon as the text-to-speech conversion is completed, which is the natural impulse of persons involved in conversations, such a delay is undesirable. In fact, such a delay can cause a) consternation to the unimpaired person or b) loss of that which the unimpaired person said, should he forget the existence of such a delay and begin speaking immediately upon completion of the text-to-speech conversion.

SUMMARY OF THE INVENTION

We have recognized that the length of the delay in assigning an attendant to an established relay session may be controlled, in accordance with the principles of the invention, by allowing a maximum of K relay sessions to be established in a telecommunications relay service center. An established relay session is one that is 1) being served by an attendant, 2) is waiting to be reconnected to an attendant or 3) is in the midst of the text-to-speech conversion process. In accordance with the principles of the invention, requests to establish new relay sessions that arrive at the telecommunications relay service processing center when K relay sessions have already been established are held in an arrival queue until a) an established relay session terminates, b) none of the established relay sessions are queued and waiting for an attendant and c) an attendant is available. Thus, when K relay sessions are already established, new relay sessions are not permitted to be established even though there are periods, either when the request to establish the relay session is initially received or subsequent thereto, when an attendant is available to process requests for such new relay sessions and establish them. The value of K is greater than or equal to the number of attendants. It is determined dynamically, as a function of the operational parameters of the telecommunications relay service center, including 1) a given set of performance objectives, 2) the current set of traffic characteristics, 3) the current performance characteristics and 4) the resources available at the telecommunications relay service center. It is noted that the principles of the invention have application whenever a communication process is performed in two alternating phases, the first phase being attendant assisted and the second phase being without attendant assistance, e.g., either direct or automated, and it is critical that at the end of the second phase that the attendant's assistance be provided within a short period of time.

DETAILED DESCRIPTION

Figure 1:
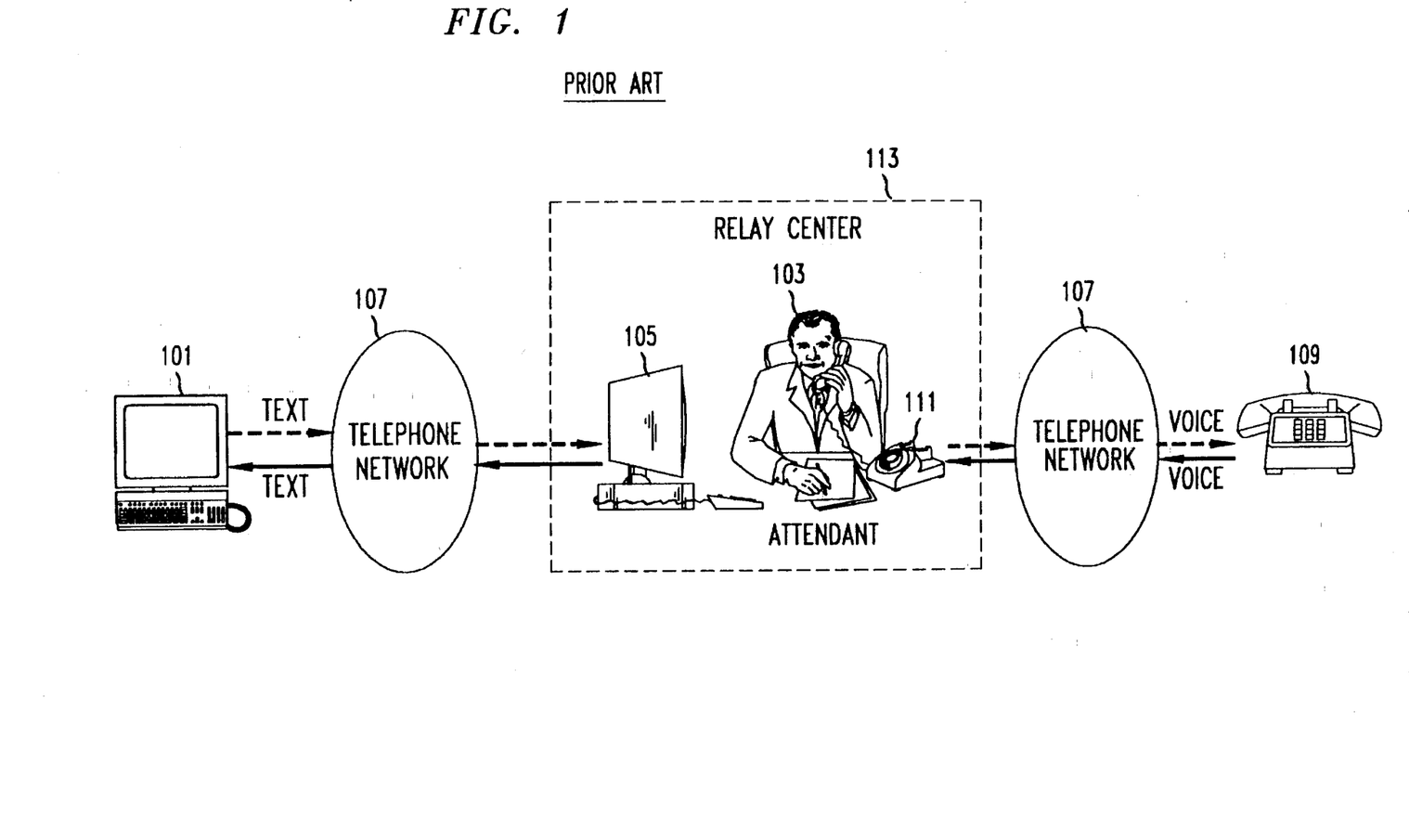
FIG. 1 shows a simplified representation of the currently deployed, prior art, telecommunications relay service.

FIG. 1 shows a simplified representation of the currently deployed, prior art, telecommunications relay service. A sound impaired person employs text telephone 101 to establish a first connection for a relay session, which is a data link with live attendant 103, who employs compatible text telephone 105. The relay session is established over telephone network 107. Attendant 103 determines with whom the sound impaired person desires to communicate and establishes the second connection for the communications relay, which is a voice telephone link, from telephone station set 111 to the desired person at telephone station set 109. It is noted that the connections of the communications relay could be established in reverse order, i.e., the establishment of a voice telephone link first, followed by a data link between text telephones 105 and 101. However, in either case, attendant 103 must be first contacted to set up the relay session.

Regardless of which connection is initiated first, communication proceeds by alternating seriatim between the following two phases. In the first phase, a text message is input to text telephone 101 by the sound impaired person. Upon concluding the inputting of the text message, the sound impaired person inputs a predetermined end-of-message code word, such as "CA", which stands for "go ahead", indicating he has completed his message. The text message appears at terminal 105 of attendant 103 who reads aloud the message into telephone station set 111, thereby relaying it, so that which was input as the message by the sound impaired person can be heard by the unimpaired person at telephone station set 109.

When the unimpaired person at telephone station set 109 hears the code word indicating the end of the message, e.g., "GA" or "go ahead", he begins the second phase of the communications relay by speaking his own message into telephone station set 109. The attendant hears, via telephone station set 111, that which is spoken by the unimpaired person and transcribes it into terminal 105 for transmission to text telephone 101. When the unimpaired person has finished speaking his message, he speaks the end-of-message code word. The sound impaired person reads the message, as transcribed by the attendant, at terminal 101. When he reads the end-of-message code word, the sound impaired person may again begin the first communication phase and enter a new message. Upon agreement of the parties, as indicated by their sending of appropriate messages, the relay session is ended by the unimpaired person going on hook at telephone station set 109 and the sound impaired person disconnecting text telephone 101 from telephone network 107.

Figure 2:
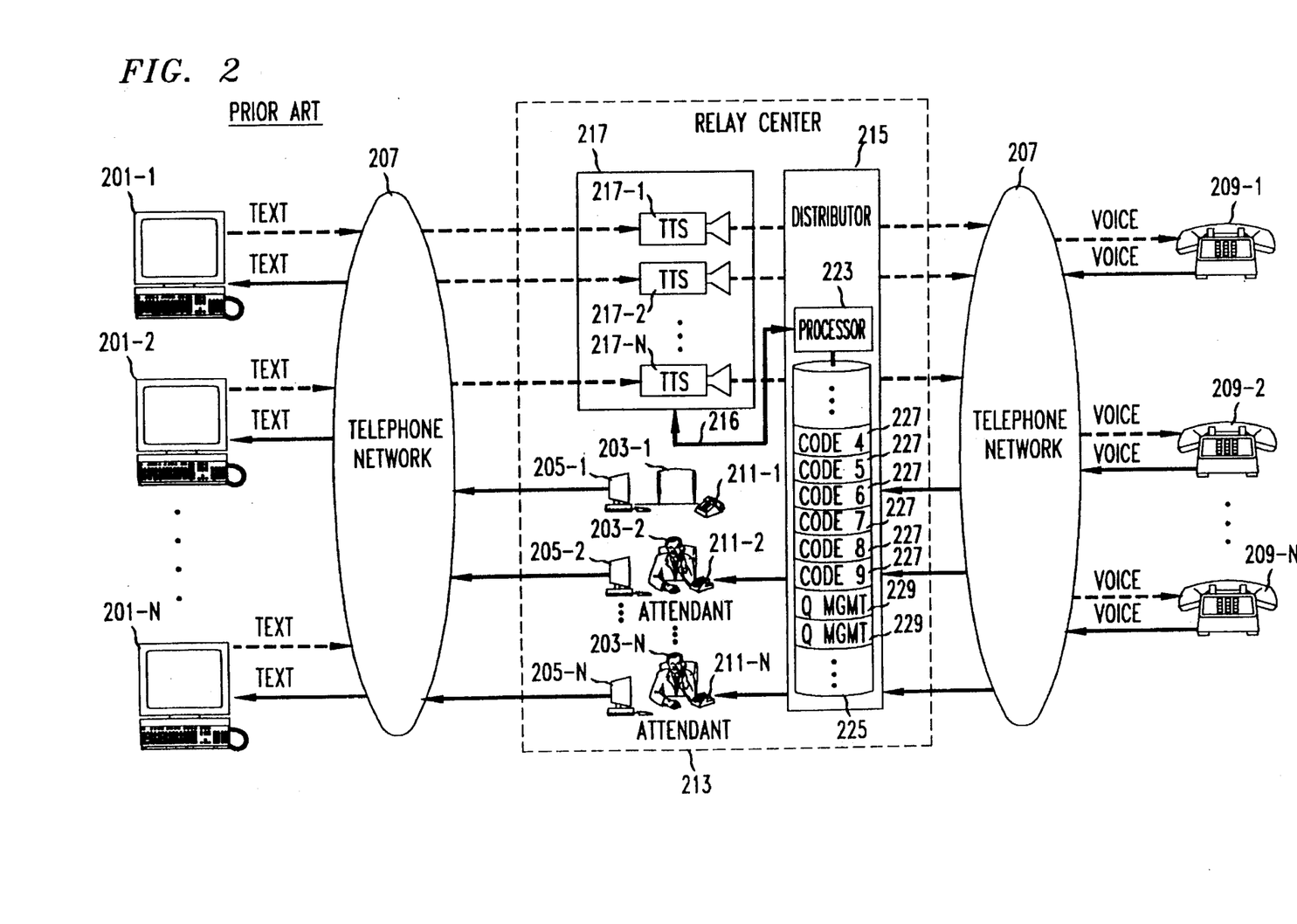
FIG. 2 shows a simplified representation of a telecommunications relay service that employs automated text-to-speech conversion in accordance with the principles of the invention.

Telecommunications relay service systems that employ automated text-to-speech conversion are known in the art and are expected to be deployed in the field shortly. For example, see U.S. Pat. No. 5,163,081 issued on Nov. 10, 1992 entitled Automated Dual Party Relay System which is incorporated herein by reference. FIG. 2 shows a simplified representation of a telecommunications relay service system that employs automated text-to-speech conversion in accordance with the principles of the invention. Shown are text telephones 201, including text telephones 201-1 through 201-N, and telephone stations sets 209, including telephone station sets 209-1 through 209-N, which can be interconnected via telephone network 207 and relay center 213 to establish relay sessions. For clarity, each direction of communication is shown separately.

As described in connection with FIG. 1, a sound impaired person at one of text telephones 201 (FIG. 2), e.g., text telephone 201-1, initiates the establishment of a relay session. After establishment of the relay session, each message input by the sound impaired person is routed to one of text-to-speech conversion units (TTS) 217-1 through 217-N, e.g., text-to-speech conversion unit (TTS) 217-2. Text-to-speech conversion unit (TTS) 217-2 converts the message into speech and causes the spoken equivalent of the message to be communicated over telephone network 207 to one of telephone station sets 209, e.g., telephone station set 209-N, at which the unimpaired individual with whom the sound impaired person desires to communicate, is located. Upon the sound impaired person's completion of the inputting of his message at text telephone 201-1, he inputs the predetermined code word, e.g., "GA", at the end of the message text. Text-to-speech conversion unit (TTS) 217-2 detects the "GA" code word but does not speak it. Instead, in response thereto, it signals distributor 215, via link 216, that one of attendants 203 is required for the next phase of the relay session.

Distributor 215 attempts to locate an available one of attendants 203, i.e., an attendant that is both present at an attendant station and is not currently actively engaged in transcribing voice messages from another relay session. If distributor 215 locates an available attendant, it assigns that attendant to the relay session for which "GA" has just been detected. If there is no attendant available, the relay session is held in a queue until an attendant becomes available for it. After the assigning of an attendant, text-to-speech conversion unit (TTS) 217-2 speaks either "GA" or an expanded version of "GA", i.e., "go ahead". Thus, there may be a delay, which, without proper controls, may not be insignificant from the point of view of the unimpaired person, in assigning the attendant after the detection of the end-of-message code word "GA" and before "GA" is relayed to the unimpaired person.

Once the unimpaired person hears the "GA", he recognizes that one of attendants 203 has been assigned to his relay session. Therefore, the second communication phase can begin, with the unimpaired person speaking a message for the sound impaired person. The speech comprising the message is heard by the assigned attendant, via his one of telephone station sets 211, and the attendant transcribes and transmits, via his one of text telephones 205, a textual representation of what he heard. Upon the speaking of "GA" or saying of "go ahead" by the unimpaired person, the attendant transcribes and transmits "GA" to the sound impaired person and a text-to-speech conversion unit is placed on line in the relay session to again begin the first phase.

Processor 223 controls operation of distributor 215. Processor 223 is connected to memory 225. Shown within memory 225 are numbered code segments 227 each of which corresponds to the process shown in the figure of the drawing identified by the same number. Also shown are code segments 229 for managing queues (QMGMT).

Figure 3:
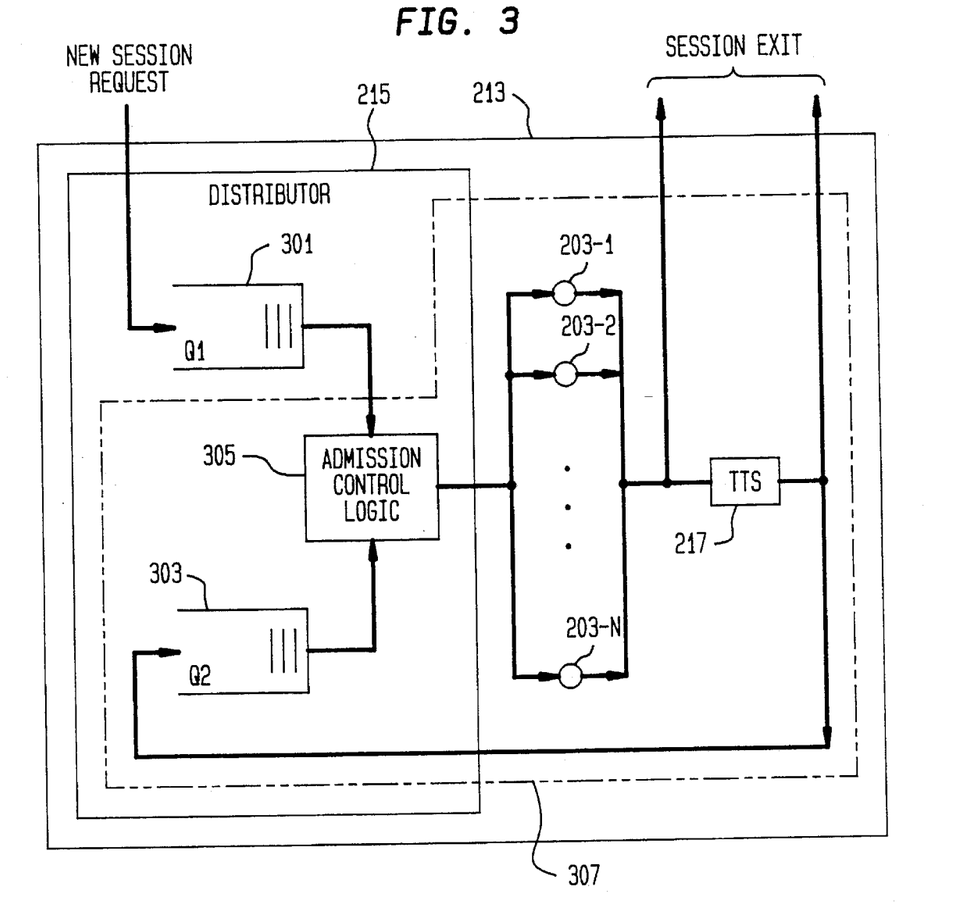
FIG. 3 shows a logical representation of the flow of relay sessions at the telecommunications relay center shown in FIG. 2.

FIG. 3 shows a logical representation of the flow of relay sessions at telecommunications relay center 213 (FIG. 2).

Shown are attendants 203-1 through 203-N, text-to-speech conversion units (TTS) 217, arrival queue (Q1) 301, reconnect queue (Q2) 303, and admission control logic 305. Arrival queue (Q1) 301 and reconnect queue (Q2) 303 are maintained in memory 225 associated with processor 223 and each is managed by one of code segments 229 for managing queues (QMGMT) in conjunction with admission control logic 305. An established relay session is one that is 1) being served by an attendant, 2) is waiting to be reconnected to an attendant, or 3) is in the midst of a text-to-speech conversion process. Such established relay sessions are represented in FIG. 3 as being within box 307.

Arrival queue (Q1) 301 holds requests for new relay sessions that are waiting to be initially set-up and established. The establishment of new relay sessions is under the control of admission control logic 305, which includes at least processor 223 and numbered code segments 227. When a new relay session is established, it is initially transferred to an available one of attendants 203. Reconnect queue (Q2) 303 holds established relay sessions that have just undergone text-to-speech conversion and require an attendant to proceed. Established relay sessions may exit telecommunications relay center 213 either after having been processed by one of attendants 203 or after having undergone text-to-speech conversion.

Figure 4:
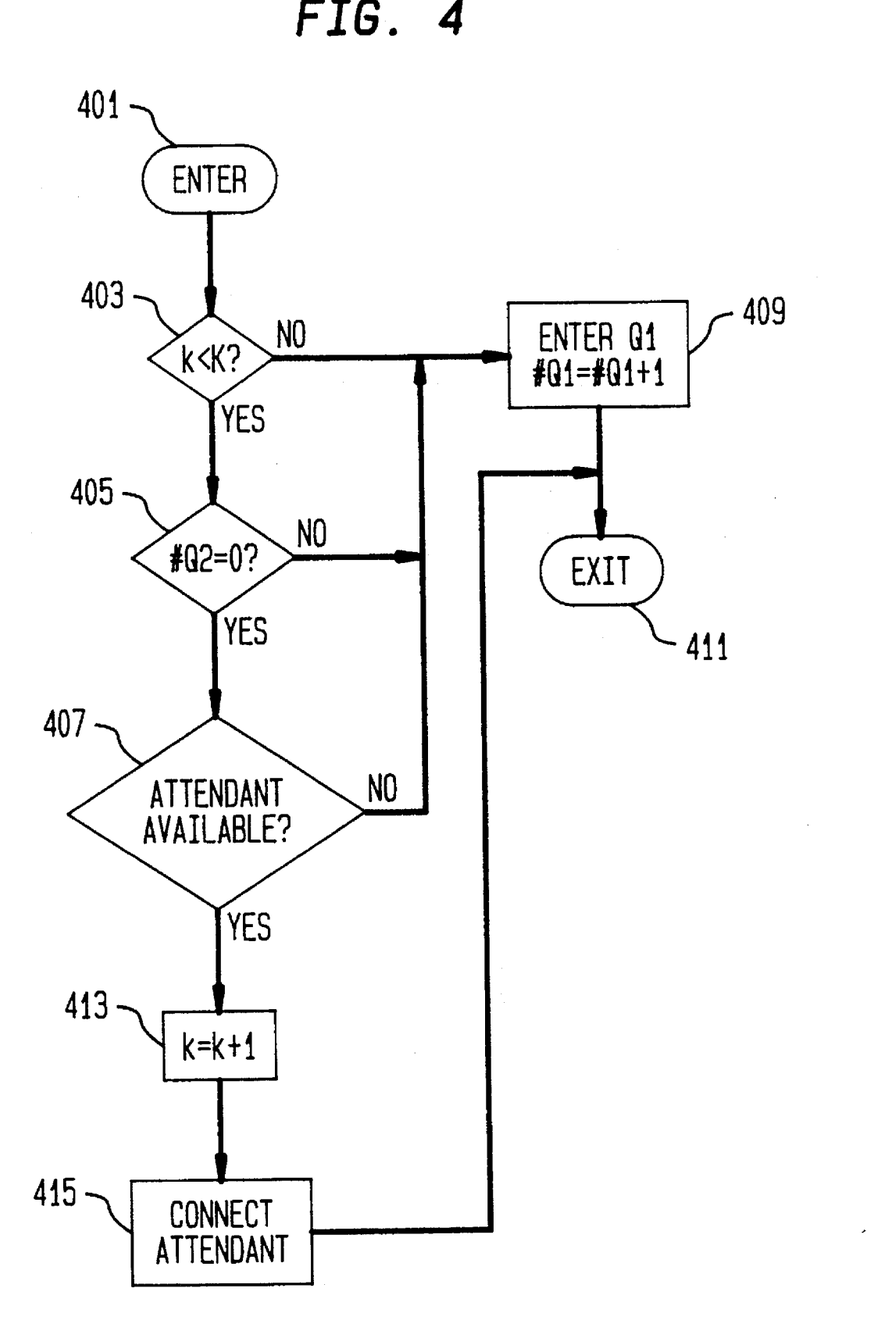
FIG. 4 shows a flowchart of a process undergone by requests for new relay sessions as they arrive at telecommunications relay center shown in FIG. 2, in accordance with the principles of the invention.

FIG. 4 shows a flowchart of a process performed by admission control logic 305 (FIG. 3) for each request for a new relay session, as the requests arrive at telecommunications relay center 213, in accordance with the principles of the invention. The process is entered in step 401, when a request to establish a new relay session is received at relay center 213 from telephone network 207. Next, conditional branch point 403 tests to determine if the number of established relay sessions k is less than the maximum number of sessions K currently allowed to be established. If the test result in step 403 is YES, control passes to conditional branch point 405, which tests to determine if the number (#Q2) of relay sessions waiting to be reconnected to one of attendants 203 in reconnect queue (Q2) 303 is equal to zero. If the test result in step 405 is YES, control passes to conditional branch point 407, which tests to determine if one of attendants 203 is available. If any of test results in step 403, 405, or 407 is NO, the arriving relay session cannot be established at this time, in accordance with the principles of the invention and, therefore, control passes to step 409, in which the request is queued at arrival queue (Q1) 301. Also, in step 409, the number (#Q1) of relay sessions held in arrival queue (Q1) 301 is incremented. The process is then exited in step 411. Thus, it is noted, that so long as k is not less than K, even if an attendant is available, the attendant is held for purposes of handling only established relay sessions, in accordance with the invention.

If the test result in step 407 is YES, this indicates that fewer than K relay sessions are already established, none of the established relay sessions are queued and awaiting an attendant and an attendant is available. Therefore, in accordance with the principles of the invention, the criteria required to establish a new relay session are met and the requested relay session can be established. Accordingly, control passes to step 413, in which the number of relay sessions k is incremented and the relay session is established by connecting it to available one of attendants 203, in step 415. The process is then exited in step 411.

Figure 5:
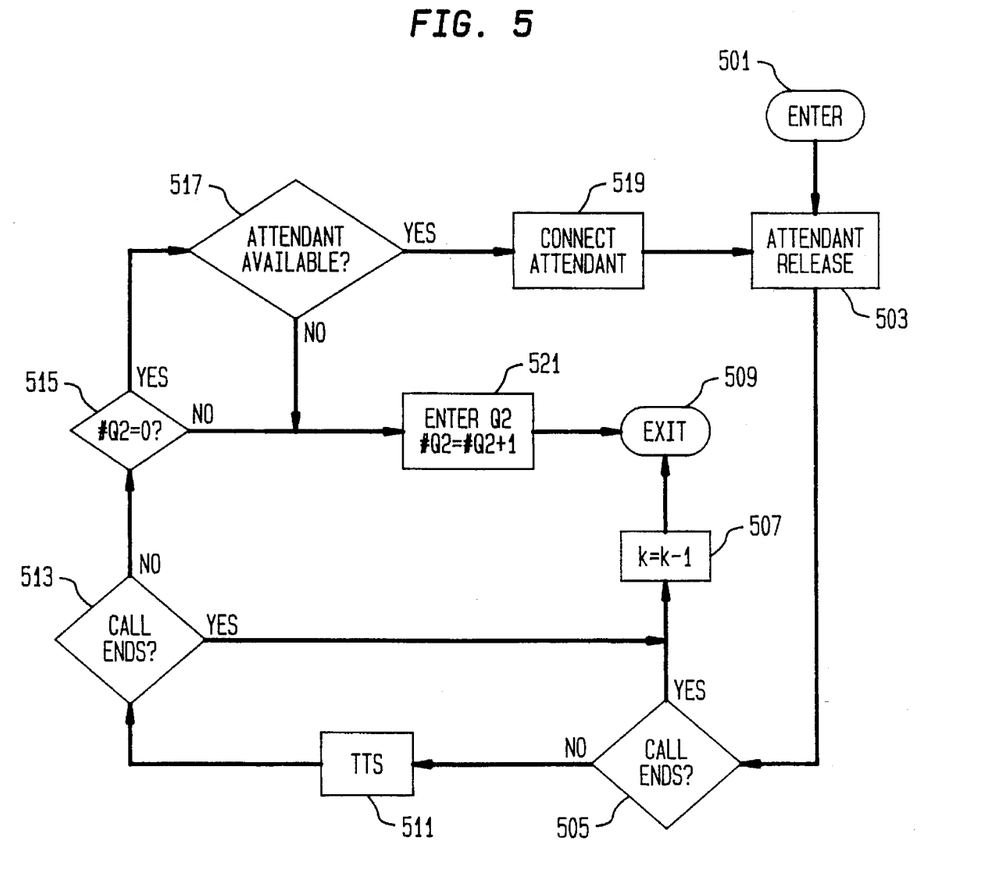
FIG. 5 shows a flowchart of a loop for processing relay sessions that have been established and are in progress in accordance with the principles of the invention.

FIG. 5 shows a flowchart of a loop for processing relay sessions that have been established, in accordance with the principles of the invention. Each relay session independently, and in parallel, undergoes the process shown, under the control of distributor 215 (FIG. 2). The process is entered, in step 501 (FIG. 5), either upon the execution of step 415 (FIG. 4), when relay sessions are initially connected to one of attendants 203 (FIG. 2), or upon a subsequent connection of the relay session to one of attendants 203, which occurs when the relay session is the next to be served from reconnect queue (Q2) 303 (FIG. 3), e.g., when the relay session is at the head of reconnect queue (Q2) 303 (FIG. 3) according to one queue service discipline, and one of attendants 203 becomes available. Thereafter, control passes to step 503 (FIG. 5), in which the release of the one of attendants 203 serving the relay session is awaited. For example, each of attendants 203 is released by the issuance of the "GA" code word or "SK", a code word meaning sign-off. Upon release of an attendant, that attendant becomes free to handle another relay session, as will be further described below.

After the release of the one of attendants 203 that was just handling the relay session, control passes to conditional branch point 505, which tests to determine if the relay session has been ended. If the test result in step 505 is YES, indicating that the relay session has been ended, e.g., an "SK" code word was received, control passes to step 507, in which k, the number of established relay sessions, is decremented. The process is then exited in step 509.

If the test result in step 505 is NO, e.g., a "GA" code word was received, control passes to step 511, in which distributor 215 assigns the relay session to an available one of text-to-speech conversion units (TTS) 217 (FIG. 2). Control passes to conditional branch point 513 (FIG. 5) when the text-to-speech conversion process is finished, e.g., upon the issuance of the "GA" code word or an "SK" a code word by the hearing impaired person. Conditional branch point 513 tests to determine if the session has been ended. If the test result in step 513 is YES, indicating that the relay session has been ended, e.g., an "SK" code word was received, control passes to step 507, in which k, the number of established relay sessions, is decremented. The process is then exited in step 509.

If the test result in step 513 is NO, e.g., a "GA" code word was received, control passes to conditional branch point 515, in which distributor 215 tests to determine if the number (#Q2) of relay sessions waiting to be reconnected to one of attendants 203 in reconnect queue (Q2) 303 is equal to zero. If the test result in step 515 is YES, control passes to conditional branch point 517, which tests to determine if one of attendants 203 is currently available. If the test result in step 517 is YES, control passes to step 519, in which the relay session is connected to a currently available one of attendants 203. Thereafter, control passes to step 503 and the process continues as described above. If the test result in step 515 or step 517 is NO, control passes to step 521, in which the relay session is placed in reconnect queue (Q2) 303 and the number (#Q2) of relay session waiting in reconnect queue (Q2) 303 is incremented. The process is then exited in step 509.

Figure 6:
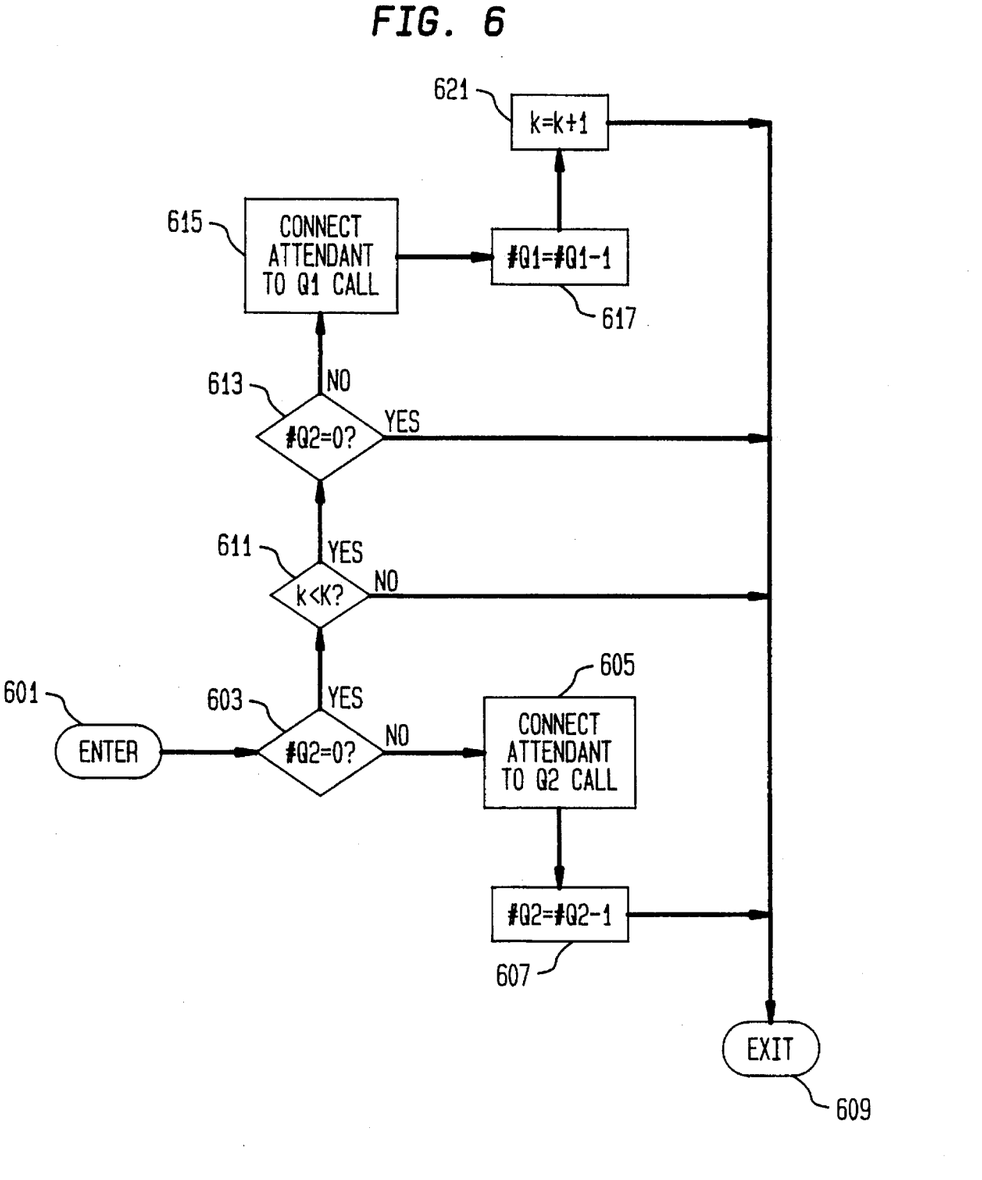
FIG. 6 shows a flowchart of a process for assigning an attendant that becomes available to a relay session, in accordance with the principles of the invention.

FIG. 6 shows a flowchart of a process for assigning an attendant that completes handling one relay session so as to become available to handle a different relay session, in accordance with the principles of the invention. The process is entered, in step 601, upon the release of an attendant during the execution of step 503 (FIG. 5) for any relay session. Control passes to conditional branch point 603 (FIG. 6), which tests to determine if the number (#Q2) of relay session waiting in reconnect queue (Q2) 303 (FIG. 3) is zero. If the test result in step 603 (FIG. 6) is NO, indicating that at least one relay session is waiting in reconnect queue (Q2) 303 for an attendant, control passes to step 605, in which the relay session next to be served from reconnect queue (Q2) 303, e.g., the relay session at the head of reconnect queue (Q2) 303, is connected to the just released attendant. In step 607, the number (#Q2) of relay sessions waiting in reconnect queue (Q2) 303 is decremented. The process is then exited in step 609.

If the test result in step 603 is YES, indicating that there aren't any relay sessions waiting for an attendant in reconnect queue (Q2) 303, control passes to conditional branch point 611, which tests to determine if the number of established relay sessions k is less than the maximum number of sessions K currently allowed to be established. If the test result in step 611 is YES, control passes to conditional branch point 613 which tests to determine if the number (#Q1) of requests to establish new relay sessions that are waiting in arrival queue (Q1) 301 to be initially connected to one of attendants 203 is equal to zero. If the test result in step 611 is YES, or in step 613 is NO, control passes to step 609 and the process is exited. Thus, it is noted that when K relay sessions are already established, new relay sessions are not permitted to be established and attendants are restricted to handling established relay sessions even though there are periods, either when the request to establish the relay session is initially received or while it is queued, when an attendant is not handling an established relay session and could process requests for such new relay sessions to establish them.

If the test result in step 613 is NO, indicating that there are requests to establish new relay sessions waiting in arrival queue (Q1) 301, control passes to step 615, in which the next request for a relay session to be served from arrival queue (Q1) 301, e.g., the request for a relay session at the head of arrival queue (Q1) 301, is connected to the just released attendant, in accordance with the principles of the invention. In step 617, the number (#Q1) of relay session waiting in arrival queue (Q1) 301 is decremented. Next, control passes to step 621, in which the number of established relay sessions k is incremented. The process is then exited in step 609.

Figure 7:
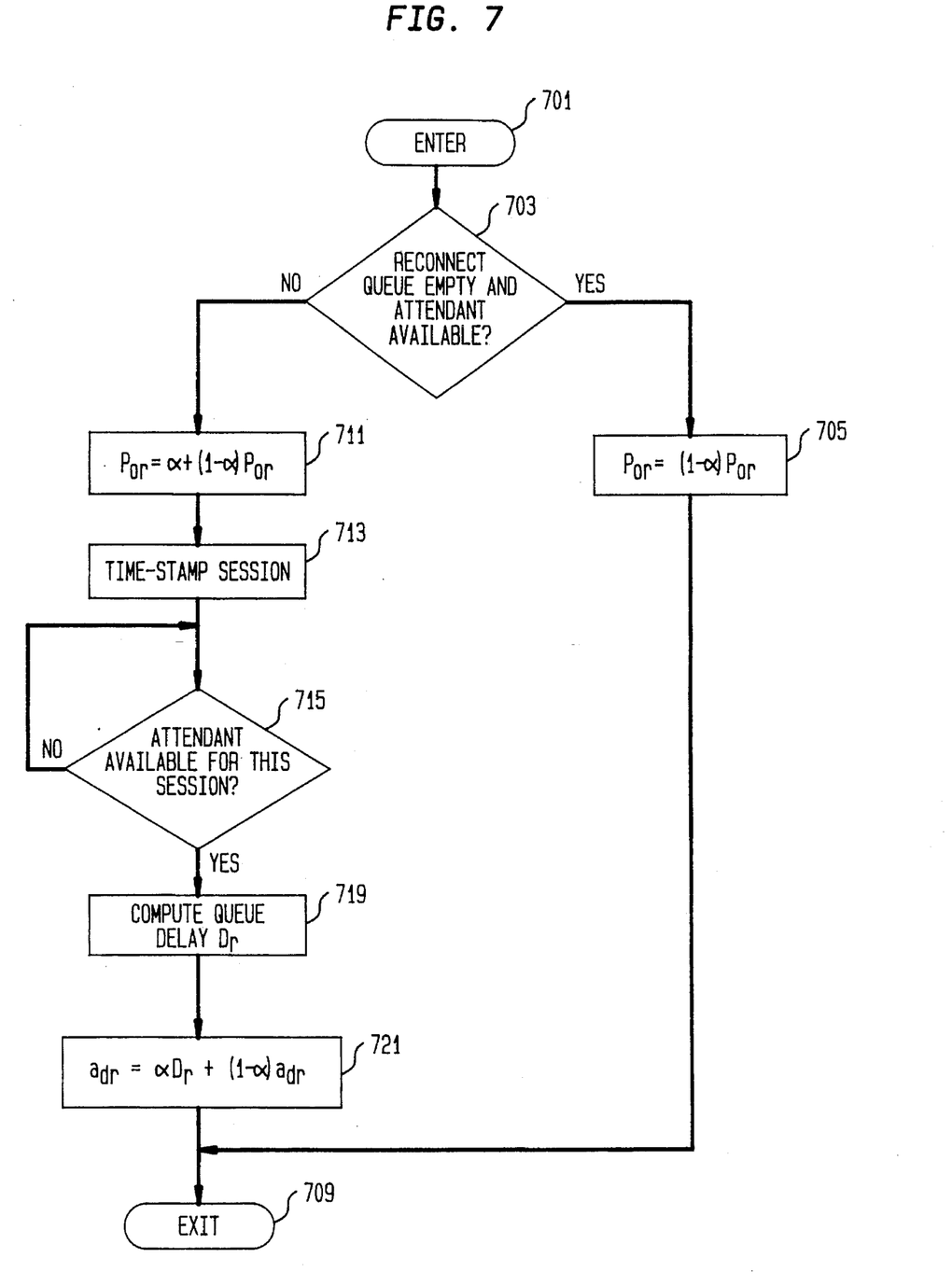
FIGS. 7, 8 and 9 form an overall process for determining K, the maximum number of sessions currently allowed to be established at a particular time.
Figure 8:
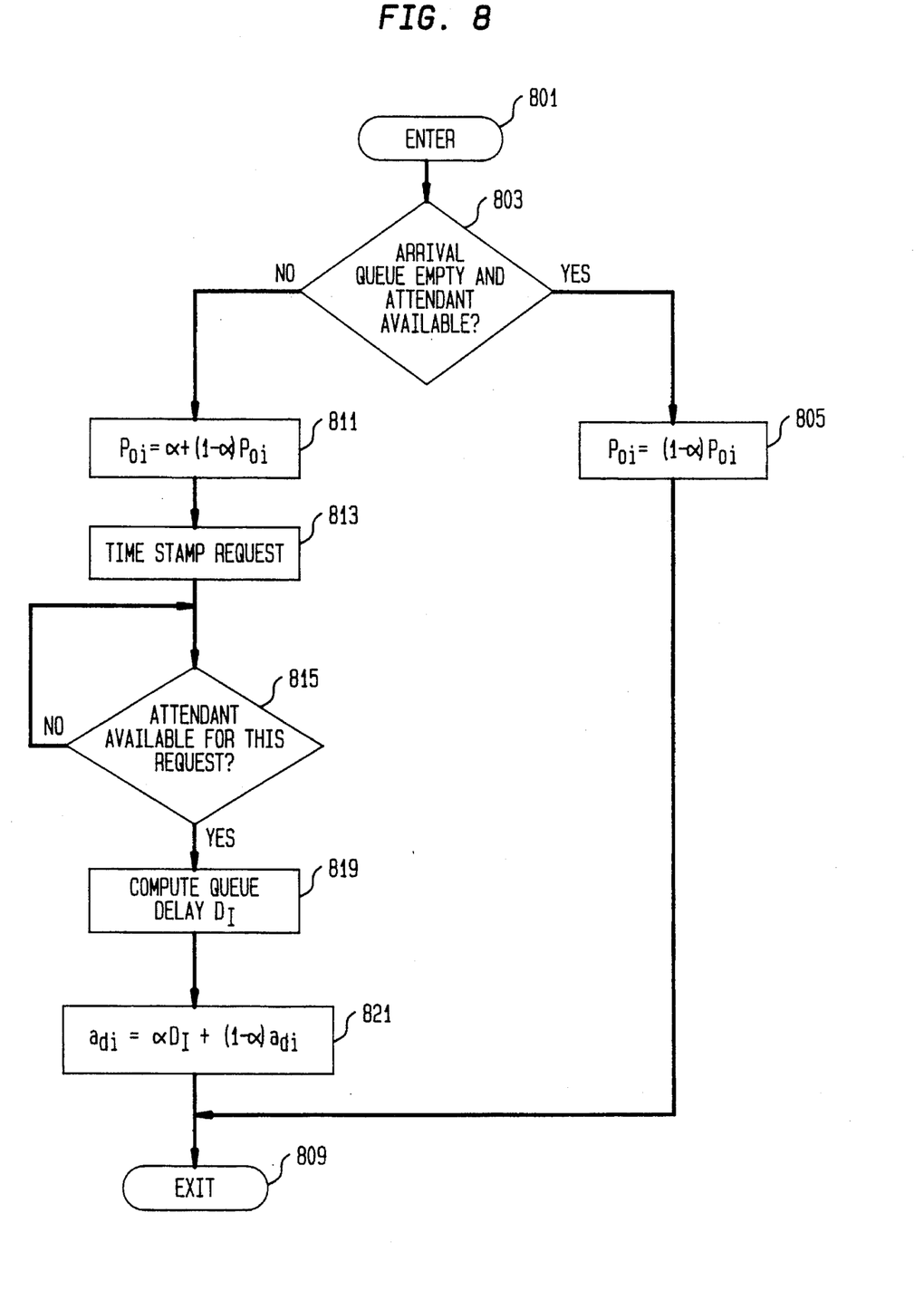
Figure 9:
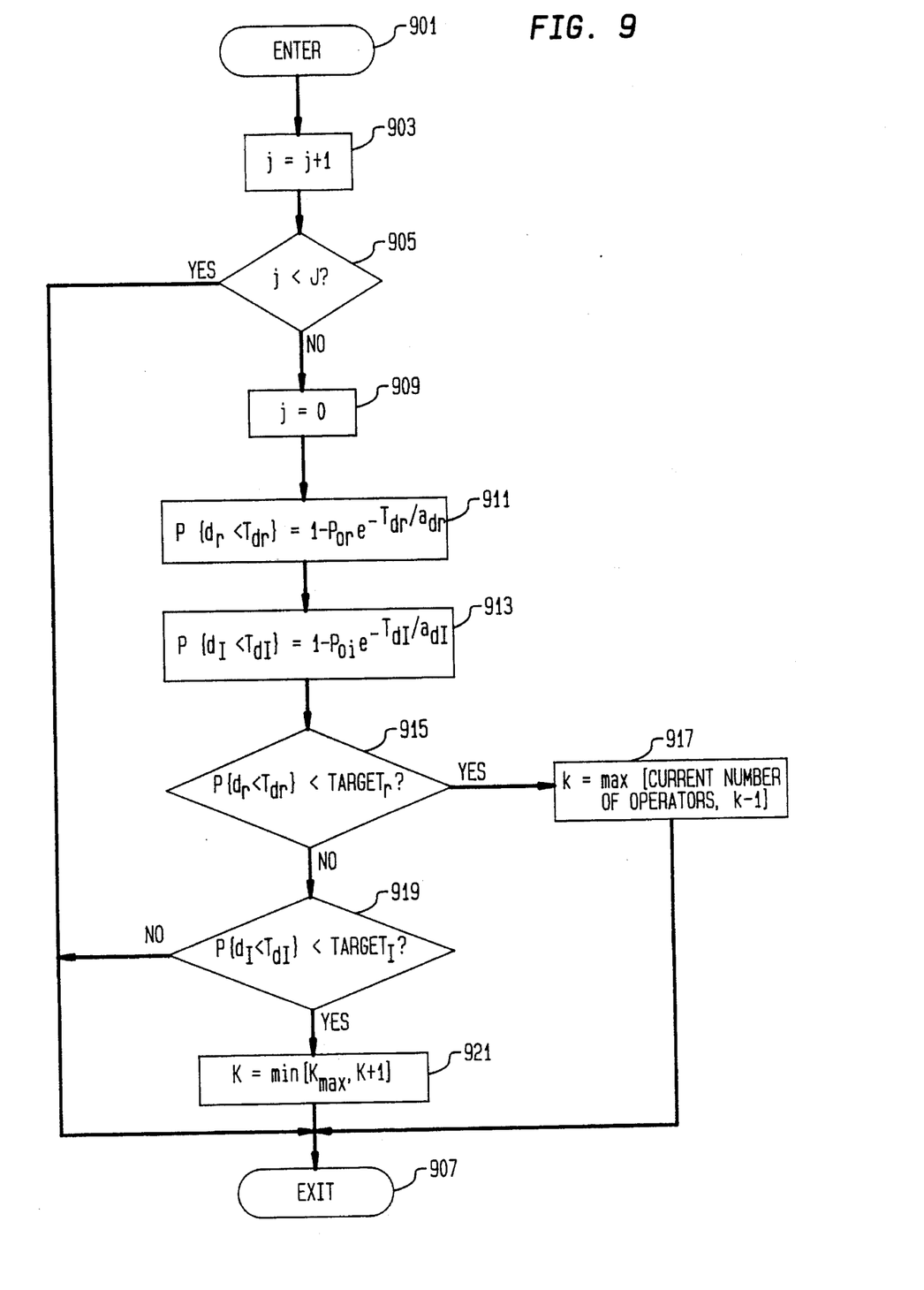

FIGS. 7, 8 and 9 combine to form a process for determining K, the maximum number of sessions currently allowed to be established at a particular time. K is determined dynamically, as a function of the operational parameters of the relay center 213, including 1) a given set of performance objectives, 2) the current set of traffic characteristics, 3) the current performance characteristics and 4) the resources available. In FIG. 7, the values of $a_{dr}$, an estimate of the average delay for a relay session awaiting an attendant, and $P_{or}$, an estimate of the probability that the delay for a relay session awaiting an attendant is greater than zero, are determined. In FIG. 8, the values of $a_{di}$, an estimate of the average delay for a new relay session request awaiting an attendant, and $P_{oi}$, an estimate of the probability that the delay for a new relay session request awaiting an attendant is greater than zero, are determined. In FIG. 9, the values obtained in FIGS. 7 and 8 are employed to determine K. Initially, when relay center 213 begins operation, K is set equal to the actual number of attendants available to handle relay sessions. Also, the initial value of each of $a_{dr}$, $P_{or}$, $a_{di}$ and $P_{oi}$ is zero.

The process in FIG. 7 is entered, in step 701, when a relay session completes text-to-speech conversion and requires an attendant. This occurs when the test result in step 513 of the process shown in FIG. 5 is NO. Control passes to conditional branch point 703, which tests to determine if the number (#Q2) of relay session waiting in reconnect queue (Q2) 303 (FIG. 3) is zero and if an attendant is available. If the test result in step 703 is YES, indicating that there aren't any relay sessions waiting for an attendant in reconnect queue (Q2) 303 and an attendant is available, control passes to step 705 in which a new value for $P_{or}$ is computed by multiplying the current value of $P_{or}$ by 1−α. α is a smoothing factor, such as those well known in the art for use in exponential smoothing. A good value for α is 0.3. The process is then exited in step 709.

If the test result in step 703 is NO, indicating that there is at least one relay sessions waiting for an attendant in reconnect queue (Q2) 303 or no attendant is currently available, control passes to step 711, in which a new value for $P_{or}$ is computed by multiplying the current value of $P_{or}$ or by 1−α and adding α to the result. Next, in step 713, the relay session is time-stamped with the current time and placed in reconnect queue (Q2) 303 to await becoming the next to be served and having an attendant available. This is the same step as step 521 of the process shown in FIG. 5. Conditional branch point 715 tests to determine if the relay session has become the next to be served relay session waiting in reconnect queue (Q2) 303 and an attendant is currently available for this relay session.

If the test result in step 715 is NO, control passes back to step 715, to await the time when the relay session will be the next to be served relay session waiting in reconnect queue (Q2) 303 and an attendant will be available. If the test result in step 715 is YES, indicating that the relay session has become the next to be served relay session waiting in reconnect queue (Q2) 303 and an attendant is currently available, control passes to step 719, in which the delay introduced by the wait in reconnect queue (Q2) 303 $D_r$ is computed by subtracting the time the session was time-stamped with in step 713 when it entered reconnect queue (Q2) 303 from the current time. When test result in 715 is YES, the process shown in FIG. 5 is entered in step 501. In step 721 a new value is computed for $a_{dr}$, the average delay for a relay session awaiting an attendant, which is $\alpha D_r + (1-\alpha)a_{dr}$. The process is then exited in step 709.

The process in FIG. 8 is entered, in step 801, when a request for a new relay session is received. This is the same as in step 401 of the process shown in FIG. 4. Control passes to conditional branch point 803, which tests to determine if the number (#Q1) of new relay session requests waiting in arrival queue (Q1) 301 (FIG. 3) is zero and if an attendant is currently available to handle this request as specified by the principles of the invention. In other words, for an attendant to be available to handle this request, in accordance with the principles of the invention, the total number of established sessions must be less than K, reconnect queue (Q2) 303 must be empty and an attendant must be idle. If the test result in step 803 is YES, indicating that there aren't any new relay session requests waiting for an attendant in arrival queue (Q1) 301 and an attendant is available to handle this request according to the invention, control passes to step 805 in which a new value for $P_{oi}$ is computed by multiplying the current value of $P_{oi}$ by 1−α. α, as noted above, is a smoothing factor, such as those well known in the art. Again, a good value for α is 0.3. The process is then exited in step 809.

If the test result in step 803 is NO, indicating that there are a) K or more relay sessions established, b) at least one relay session is waiting for an attendant in reconnect queue (Q2) 303, c) no attendant is currently available or d) a request is waiting in arrival queue (Q1) 301, control passes to step 811, in which a new value for $P_{oi}$ is computed by multiplying the current value of $P_{oi}$ by 1−α and adding α to the result. It is noted that circumstances may result in there being more than K relay sessions established in the system. Such a result is brought about if, at a first time, for a first value of K, K relay sessions are established and these relay sessions remain established for a period during which, because of excessive delays, K becomes adjusted to a second, lower value, by the processes shown in FIGS. 7, 8 and 9. Next, in step 813, the request for a new relay session is time-stamped with the current time and placed in arrival queue (Q1) 301 to wait until it is the next to be served and an attendant is available. Conditional branch point 815 tests to determine if the new relay session request has become the next request to be served from arrival queue (Q1) 301 and an attendant is currently available to handle this request. Again, for an attendant to be available to handle this new request the total number of established sessions must be less than K, reconnect queue (Q2) 303 must be empty and an attendant must be idle, in accordance with the principles of the invention.

If the test result in step 815 is NO, control passes back to step 815, to await the time when the new relay session request will be the next to be served new relay session request waiting in arrival queue (Q1) 301 and an attendant will be available. If the test result in step 815 is YES, indicating that the new relay session request has become the next request to be served from arrival queue (Q1) 301 and an attendant is currently available, control passes to step 819, in which the delay introduced by the wait in arrival queue (Q1) 301 $D_I$ is computed by subtracting the time the new relay session request was time-stamped with in step 813 when it entered arrival queue (Q1) 301 from the current time. When test result in 815 is YES, the process shown in FIG. 5 is entered in step 501. In step 821 a new value is computed for $a_{di}$, the average delay for a new relay session request awaiting an attendant, which is $\alpha D_I + (1-\alpha)a_{di}$. The process is then exited in step 809.

The process shown in FIG. 9, which determines an updated value of K, the maximum number of sessions currently allowed to be established at a particular time, is entered in step 901, upon the release of an attendant upon completion of the execution of step 503 (FIG. 5) for any relay session. In step 903, j, a counter variable, is incremented. Next, conditional branch point 905 tests to determine if j<J, where J is a fixed maximum allowable threshold for the value of j. If the test result in step 905 is YES, this indicates that the value of K need not be updated and, the process is exited in step 907. A good value for J is 7. It is noted that steps 903, 905 and 909 are optional in that the value of K may be updated every time an attendant is released, if the computing resources are available. If the test result in step 905 is NO, indicating that j=J, control passes to step 909, in which j is reset to zero.

Next, in step 911, the estimated probability $P\{dr<T_{dr}\}$ that the delay dr experienced by an established relay session waiting for an attendant in reconnect queue (Q2) 303 is less than the target delay $T_{dr}$, in seconds, for an established relay session to wait for an attendant is determined by computing $$1 - P_{or}e^{-\frac{T_{dr}}{a_{dr}}}.$$

It is desirable that this probability be high, thereby indicating that for a large percentage of the established relay sessions the delay experienced waiting for an attendant is less than the target. Similarly, in step 913, the estimated probability $P\{dI<T_{dI}\}$ that the delay dI for an a new request for a relay session will wait for an attendant in arrival queue (Q1) 301 is less than the target delay $T_{dI}$, in seconds, for requests for new relay sessions to wait for an attendant is determined by computing $$1 - P_{oi}e^{-\frac{T_{dI}}{a_{dI}}}.$$

It is also desirable that this probability be high, thereby indicating that for a large percentage of the requests for new relay sessions the delay experienced initially in waiting for an attendant is less than the target.

Conditional branch point 915 tests to determine if $P\{dr<T_{dr}\}$ is less than Target$_r$, a target fraction. Target$_r$ is the minimum fraction of established relay sessions that should wait in reconnect queue (Q2) 303 less than $T_{dr}$ seconds. A good range for Target$_r$ is from 0.95 to 0.99. If the test result in step 915 is YES, indicating that fewer relay sessions than the target fraction are being served by an attendant within $T_{dr}$ seconds, control passes to step 917, in which a new value is assigned to K that is the greater of the number of attendants currently available to handle relay sessions or the current value of K less 1, i.e., unless K is already at its minimum level, its value is decremented. The process is then exited in step 907. A good value for $T_{dr}$ at is 2 seconds.

If the test result in step 915 is NO, indicating that the probability that an established relay session requiring an attendant will experience a delay less than $T_{dr}$ is more than Target$_r$, control passes to conditional branch point 919, which tests to determine if $P\{dI<T_{dI}\}$ is less than Target$_I$, another target fraction. A good value for Target$_I$ is 0.85. If the test result in step 919 is YES, indicating that less requests for new relay sessions than the target fraction are being served by an attendant within $T_{dI}$ seconds, control passes to step 921 in which a new value is assigned to K that is the lesser of $K_{max}$ or the current value of K plus 1. $K_{max}$ is the maximum value that K can take. In other words, unless K is already at its maximum level, its value is incremented. A good value for $K_{max}$ at any time is three times the number of attendants actually working at that time. Also, a good value for $T_{dI}$ is 10 seconds. The process is then exited in step 907. If the test result in step 919 is NO, the process is also exited in step 907.

The foregoing merely illustrates the principles of the inventions. It will thus be appreciated that those skilled in the art will be able to devise various arrangements which, although not explicitly described or shown herein, embody the principles of the invention and are thus within its spirit and scope. It is particularly noted that the invention has application whenever a communication process is performed in two alternating phases, the first phase being attendant assisted and the second phase being without attendant assistance, e.g., either direct or automated, and it is critical that at the end of the second phase that the attendant's assistance be provided within a short period of time.

We claim:

1. A method for use in a system employing the services of, when operational, a variable number of live attendants ranging from a minimum of one to predetermined maximum, said system being for processing communication sessions which each have at least first and second ordered phases which recur in order, said first phase requiring one of said live attendants to assist on said communication session and said second phase proceeds without assistance of any of said live attendants, said method being characterized by the step of:

establishing in said system a new communication session in response to a request therefor only when (a) less than a predetermined number of communication sessions are currently being processed in said system, said predetermined number being more than the current value of the number of live attendants and less than the number of communication sessions that can be established in said system based on the physical capacity of said system, (b) no communication session is waiting for one of said live attendants and (c) one of said live attendants is available.

2. The invention as defined in claim 1 wherein the value of said predetermined number is determined dynamically as a function of operating parameters of said system for processing communication sessions.

3. The invention as defined in claim 2 wherein said predetermined number is decreased only when a probability that a communication session must wait more than a predetermined target length of time for one of said live attendants for said first phase is greater than a predetermined threshold probability.

4. The invention as defined in claim 2 wherein said predetermined number is increased only when a probability that a communication session must wait more than a first predetermined target length of time for one of said live attendants for said first phase is less than a first predetermined threshold probability and a probability that a request for a new communication session must wait more than a second predetermined target length of time for one of said live attendants for said first phase is greater than a second predetermined threshold probability.

5. The invention as defined in claim 2 wherein said predetermined number is determined responsive to values of each member of a set of current operating parameters of said system.

6. The invention as defined in claim 5 wherein said set of current operating parameters includes one or more of the following:

a set of performance objectives, a current set of traffic characteristics, current performance characteristics, and resources currently available to said system for processing communication sessions.

7. A method for use in a system employing the services of, when operational, a variable number of live attendants ranging from a minimum of one to predetermined maximum, said system being for processing relay sessions over a telephone network between sound impaired and unimpaired persons, during each of said relay sessions at least one of said live attendants transcribes and transmits to the sound impaired person that which is spoken by the unimpaired person and an automated text-to-speech system converts into speech to be heard by the unimpaired person that which is input by the sound impaired person, without assistance of any of said live attendants, said method being characterized by the step of:

establishing in said system a new relay session in response to a request therefor only when (a) less than a predetermined number of relay sessions are currently being processed in said system, said predetermined number being more than the current value of said number of said live attendants and less than the number of relay sessions that can be established in said system based on the physical capacity of said system, (b) no relay session is waiting for one of said live attendants and (c) one of said live attendants is available.

8. The invention as defined in claim 7 wherein said predetermined number is determined dynamically as a function of operating parameters of said system for processing relay sessions.

9. The invention as defined in claim 8 wherein said predetermined number is decreased only when a probability that an established relay session must wait more than a predetermined target length of time for one of said live attendants is greater than a predetermined threshold probability.

10. The invention as defined in claim 8 wherein said predetermined number is increased only when a probability that a relay session must wait more than a first predetermined target length of time for one of said live attendants is less than a first predetermined threshold probability and a probability that a request for a new relay session must wait more than a second predetermined target length of time for one of said live attendants is greater than a second predetermined threshold probability.

11. A method for use in a system employing the services of, when operational, a variable number of live attendants ranging from a minimum of one to predetermined maximum, said system being for processing relay sessions over a telephone network between sound impaired and unimpaired persons, during each of said relay sessions at least one of said live attendants transcribes and transmits to the sound impaired person that which is spoken by the unimpaired person and an automated text-to-speech system converts into speech to be heard by the unimpaired person that which is input by the sound impaired person, without assistance of any of said live attendants, said method being characterized by the step of:

placing an arriving request for a new relay session in a queue, rather than substantially immediately establishing a relay session therefor, only when more than a predetermined number of relay sessions are currently being processed in said system, said predetermined number being more than the current value of said number of said live attendants and less than the number of relay sessions that can be established in said system based on the physical capacity of said system.

12. A method for use in a system employing the services of, when operational, a variable number of live attendants ranging from a minimum of one to predetermined maximum, said system being for processing communication sessions which each have at least first and second ordered phases which recur in order, said first phase requiring one of said live attendants to assist on said communication session and said second phase proceeds without assistance of any of said live attendants, said method being characterized by the step of:

receiving a request to establish a new communication session; and denying assignment of an available attendant to handle said request for a new communication session unless (a) less than a predetermined number of communication sessions are currently established, said predetermined number being more than the current value of the number of live attendants and less than the number of communication sessions that can be established in said system based on the physical capacity of said system, (b) no communication session in said system is waiting for one of said live attendants and (c) one of said live attendants is available.

13. A method for use in a system employing the services of, when operational, a variable number of live attendants ranging from a minimum of one to predetermined maximum, said system being for processing communication sessions which each have at least first and second ordered phases which recur in order, said first phase requiring one of said live attendants to assist on said communication session and said second phase proceeds without assistance of any of said live attendants, said method being characterized by the step of:

restricting assignment of each of said attendants that becomes available to only said communication sessions unless (a) less than a predetermined number of communication sessions are currently established, said predetermined number being more than the current value of the number of live attendants and less than the number of communication sessions that can be established in said system based on the physical capacity of said system, (b) no communication session in said system is waiting for one of said live attendants and (c) one of said live attendants is available.

14. The invention as defined in claim 13 wherein said predetermined number is selected so as to keep a probability that a communication session to be connected to an attendant must wait more than a target delay for said attendant is less than a target fraction.

15. A method for use in a system employing the services of, when operational, a variable number of live attendants ranging from a minimum of one to predetermined maximum, said system being for processing relay sessions over a telephone network between sound impaired and unimpaired persons, during each of said relay sessions at least one of said live attendants transcribes and transmits to the sound impaired person that which is spoken by the unimpaired person and an automated text-to-speech system converts into speech to be heard by the unimpaired person that which is input by the sound impaired person, without assistance of any of said live attendants, said method being characterized by the step of:

denying a request to establish a new relay session in said system, even though an attendant is available, when establishment of said new relay session in response to said request would result in a delay in assigning an attendant to a relay session already in said system that is greater than a predetermined target delay.

16. Apparatus for use in a system employing the services of, when operational, a variable number of live attendants ranging from a minimum of one to predetermined maximum, said system being for processing communication sessions which each have at least first and second ordered phases which recur in order, said first phase requiring one of said live attendants to assist on said communication session and said second phase proceeds without assistance of any of said live attendants, said apparatus comprising:

means for detecting when a live attendant becomes available; and means for assigning an available one of said live attendants to a request for a new communication session only when (a) less than a predetermined number of communication sessions are currently established, the value of said predetermined number being set before detection of said live attendant becoming available and being more than the current value of the number of live attendants and less than the number of communication sessions that can be established in said system based on the physical capacity of said system and (b) no communication session is waiting for one of said live attendants.

17. The invention as defined in claim 16 including:

means for determining values of each member of a set of current operating parameters for said system; and means responsive to said values for determining said predetermined number.

18. The invention as defined in claim 17 wherein said members of said set of current operating parameters of said system includes one or more of the following:

a set of performance objectives, a current set of traffic characteristics, current performance characteristics, and resources currently available to said system for processing communication sessions.

19. The invention as defined in claim 16 including means for decreasing said predetermined number only when a probability that a communication session must wait more than a predetermined target length of time for one of said live attendants for said first phase is greater than a predetermined threshold probability.

20. The invention as defined in claim 16 including means for increasing said predetermined number only when a probability that a communication session must wait more than a first predetermined target length of time for one of said live attendants for said first phase is less than a first predetermined threshold probability and a probability that a request for a new communication session must wait more than a second predetermined target length of time for one of said live attendants for said first phase is greater than a second predetermined threshold probability.

21. Apparatus for use in a system employing the services of, when operational, a variable number of live attendants ranging from a minimum of one to predetermined maximum, said system being for providing telecommunications relay service on relay sessions in each of which an automated text-to-speech system converts into speech to be heard by a sound unimpaired person that which is input by a sound impaired person and at least one of said live attendants transcribes and transmits to the sound impaired person that which is spoken by the unimpaired person, said apparatus comprising:

means for detecting when one of said live attendants becomes available; and means for assigning a detected available one of said live attendants to a new relay session in response to a request for a new relay session only when (a) less than a predetermined number of relay sessions are currently established, said predetermined number being more than the current value of said number of said live attendants and less than the number of relay sessions that can be established in said system based on the physical capacity of said system, and (b) no relay session is waiting for said detected available attendant.

22. The invention as defined in claim 21 including:

means for determining a set of current operating parameters for said system; and means responsive to said set for determining the value of said predetermined number.

23. The invention as defined in claim 22 wherein said set of current operating parameters of said system includes one or more of the following:

a set of performance objectives, a current set of traffic characteristics, current performance characteristics, and resources currently available to said system.

24. The invention as defined in claim 23 including means for decreasing said predetermined number only when a probability that a relay session must wait more than a predetermined target length of time for one of said live attendants is greater than a predetermined threshold probability.

25. The invention as defined in claim 23 including means for increasing said predetermined number only when a probability that a relay session must wait more than a first predetermined target length of time for one of said live attendants is less than a first predetermined threshold probability and a probability that a request for a new relay session must wait more than a second predetermined target length of time for one of said live attendants is greater than a second predetermined threshold probability.

26. Apparatus for use in a system employing the services of, when operational, a variable number of live attendants ranging from a minimum of one to predetermined maximum, said system being for providing telecommunications relay service on relay sessions in each of which an automated text-to-speech system converts into speech to be heard by a sound unimpaired person that which is input by a sound impaired person and at least one of said live attendants transcribes and transmits to the sound impaired person that which is spoken by the unimpaired person, said apparatus comprising:

means for detecting when one of said live attendants becomes available; and means for reserving a detected available one of said live attendants for a relay session already established by said apparatus when there are already at least a maximum predetermined number of relay sessions in said system, said maximum predetermined number being more than the current value of said number of said live attendants and less than the number of relay sessions that can be in said system based on the physical capacity of said system.

27. The invention as defined in claim 26 wherein said means for reserving denies access to a detected available one of said live attendants by any request for a new relay session when at least said maximum predetermined number of relay sessions are already in said system.

* * * * *